US012577084B1

(12) United States Patent
Clawson

(10) Patent No.: US 12,577,084 B1
(45) Date of Patent: Mar. 17, 2026

(54) WINCH RING

(71) Applicant: DRVN Industries, LLC, Burley, ID (US)

(72) Inventor: Alan R. Clawson, Rupert, ID (US)

(73) Assignee: DRVN INDUSTRIES, LLC, Burley, ID (US)

( * ) Notice: Subject to any disclaimer, the term of this patent is extended or adjusted under 35 U.S.C. 154(b) by 179 days.

(21) Appl. No.: 18/136,099

(22) Filed: Apr. 18, 2023

Related U.S. Application Data

(63) Continuation-in-part of application No. 29/815,322, filed on Nov. 12, 2021, now Pat. No. Des. 1,015,227.

(51) Int. Cl.
*B66D 1/36* (2006.01)

(52) U.S. Cl.
CPC .................................... *B66D 1/36* (2013.01)

(58) Field of Classification Search
CPC ... B66D 1/36; B66D 3/04; B66D 3/06; B66D 3/08
See application file for complete search history.

(56) References Cited

U.S. PATENT DOCUMENTS 1,240,966 A * 9/1917 Gould .................... F16G 11/10 188/65.1
2,647,943 A * 8/1953 Kreisler ................ H01B 17/12 174/207
8,596,615 B2 * 12/2013 Kommer ................ B66D 3/10 254/408
10,309,443 B1 * 6/2019 Driver .................... F16G 11/04
10,351,402 B2 * 7/2019 Bullock .................. B66C 1/12
D950,362 S * 5/2022 Franta ........................ D8/360
D1,015,227 S * 2/2024 Clawson .................... D12/162
2008/0203371 A1 * 8/2008 Mauthner ............... B66D 3/04 254/391
2012/0119529 A1 * 5/2012 Chih ...................... B66D 3/04 294/82.15
2016/0152452 A1 * 6/2016 Barnet ................... B66D 3/04 254/390
2021/0130142 A1 * 5/2021 Costa ..................... B66D 1/36
2022/0267125 A1 * 8/2022 Schipper ................ B66D 3/04

* cited by examiner

*Primary Examiner* — Victoria P Augustine
*Assistant Examiner* — Nathaniel L Adams
(74) *Attorney, Agent, or Firm* — Buckingham, Doolittle & Burroughs, LLC

(57) ABSTRACT

A winch ring includes a body a having an outer annular groove to receive a winch line therein. The body also includes an attachment aperture that is eccentric or offset relative to the outer annular groove, whereby the attachment aperture is used to secure the winch ring in place. The eccentric or offset configuration forms a cam surface, which prevents the winch ring from rotating relative to the attachment line when a winch line is moved through the outer annular groove or moved through the attachment aperture. As a result of the lack of rotation of the winch ring, friction and heat are minimized, preventing the premature failure of the attachment line.

18 Claims, 9 Drawing Sheets

WINCH RING

CROSS-REFERENCE TO RELATED APPLICATION

This application is a continuation-in-part of U.S. Design patent application No. 29/815,322 filed Nov. 12, 2021, the contents of which are incorporated herein by reference.

TECHNICAL FIELD

The various embodiments disclosed herein relate to devices for use in creating pulling systems for pulling objects. In particular, the various embodiments disclosed herein relate to winch rings for forming pulley systems. More particularly, the various embodiments disclosed herein relate to a winch ring having an eccentric or offset attachment aperture that prevents the winch ring from rotating as a winch line is pulled therearound.

BACKGROUND

Winch rings are commonly used to form pulley systems that multiply the pulling force that is generated by a pulling source, such as an electromechanical winch system for example. These pulley systems are especially desirable for moving vehicles that have become stuck and cannot be readily moved under their own power. Winch rings generally have a unified body, which is formed of a single section of metal and which includes both an outer annular groove and an attachment aperture that is centrally arranged within the winch ring body, such that the annular groove is perpendicular to the axial center of the attachment aperture. That is, the central aperture is concentric with the outer annular groove, whereby the perimeter of the attachment aperture is equidistant from the outer annular groove, and as such, the attachment aperture is centrally positioned relative to the annular outer groove.

In one example of a pulley system using the winch ring, the winch ring is attached to an object that is desired to be moved by an attachment line, such as a soft shackle, which forms a loop that extends through the central attachment aperture of the winch ring. In addition, a winch line is received within the annular groove of the winch ring, such that one free end of the winch line is attached to a pulling point that applies a pulling force (such as by an electromechanical winch), while the other free end of the winch line is attached to a fixed, stationary point. As the winch takes up the winch line, the pulley system multiplies the force imparted to the winch ring through the attachment line or soft shackle that is attached to the object that is desired to be moved.

As a result of the concentric configuration of the central aperture and the annular outer groove of the winch ring, the application of a pulling force on the winch line and its frictional engagement with the outer annular groove of the winch ring causes the winch ring to rotate relative to the attachment line or soft shackle that is securing the winch ring in place. This rotation causes friction to be generated against the attachment line or soft shackle. Furthermore, the soft shackle is typically formed of a synthetic rope, and as a result of the friction imparted by the rotation of the winch ring, a tremendous amount of heat is imparted to the attachment line or soft shackle. As a result, the operational life of the attachment line or soft shackle is reduced, while the risk for potential for serious or fatal injury to a bystander should the attachment line or soft shackle fail is increased.

Therefore, there is a need for a winch ring that is configured so that it does not rotate relative to an attachment line/soft shackle that is looped through an attachment aperture of the winch ring to secure it in place as a winch line is pulled through the annular groove, thereby preventing the build-up of friction and heat between the attachment line/soft shackle and the winch ring, so as to extend the operating life of the soft shackle. In addition, there is a need for a winch ring that includes an attachment aperture that is eccentric or offset relative to an outer annular groove that carries the winch line to prevent the winch ring from rotating when the winch line is pulled. Furthermore, there is a need for a winch ring that includes an attachment aperture having tapered openings to reduce the generation of friction and heat about an attachment line/soft shackle that is looped therethrough during operation of the winch ring in a pulley system. In addition, there is a need for a winch ring that provides a plurality of pulleys or pulley blocks.

SUMMARY

In light of the foregoing, it is a first aspect of the various embodiments disclosed herein to provide a winch ring comprising a body, an annular groove disposed in the body, a first flange and a second flange disposed on opposed sides of the groove, and a cavity extending through the body from a first opening to a second opening, the cavity being eccentric to the annular groove.

It is another aspect of the various embodiments disclosed herein to provide an unassembled kit comprising a winch ring comprising a body, an annular groove disposed in the body, a first flange and a second flange disposed on opposed sides of the groove, and a cavity extending through the body from a first opening to a second opening, the cavity being eccentric to the annular groove; an attachment line adapted to be coupled to the cavity; and a winch line adapted to be received in the annular groove.

BRIEF DESCRIPTION OF DRAWINGS

These and other features and advantages of the various embodiments disclosed herein will become better understood with regard to the following description, appended claims, and accompanying drawings, wherein:

WRITTEN DESCRIPTION

Figure 1:
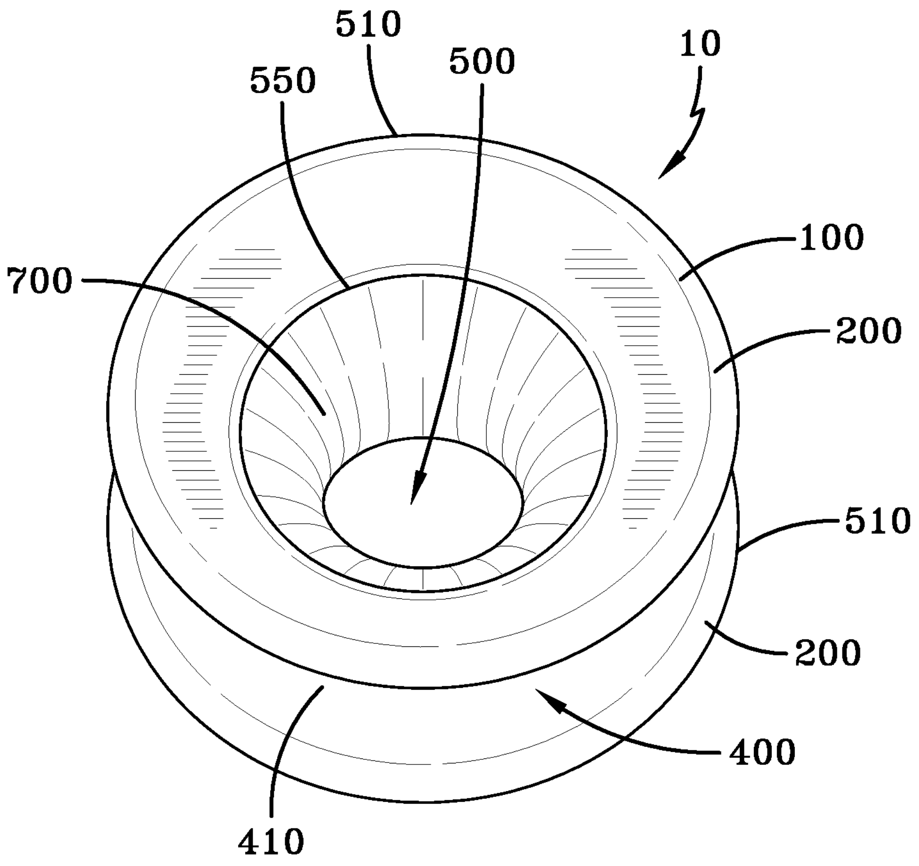
FIG. 1 is a perspective view of a winch ring in accordance with the concepts of the various embodiments disclosed herein.

A winch ring 10 in accordance with the various embodiments disclosed herein is shown in FIGS. 1-4. The winch ring 10 includes a body 100 having a pair of faces or flanges 200 that are separated by an annular groove 400 that circumscribes the body 100. Disposed through the body 100 and through the flanges 200 is an attachment aperture or cavity 500, which is positioned so as to be eccentric or offset relative to the annular groove 400. Thus, the offset relationship between the attachment aperture 500 and the groove 400 forms a cam lobe 401 by the groove 400. That is, because the attachment aperture 500 is not centrally positioned relative to the annular groove 400, but rather is offset relative to the annular groove 400, the winch ring 10 forms a cam configuration. This cam configuration of the winch ring 10 prevents the winch ring 10 from rotating when placed in use and secured by an attachment loop formed by an attachment line, such as a soft shackle. As a result of this lack of rotation of the winch ring 10, the attachment line or soft shackle is exposed to reduced friction and heat, thereby extending the operating life of the attachment line or soft shackle, and preventing injury, including a catastrophic injury should the attachment line/soft shackle entirely fail, thereby releasing the force in a projectile manner to those individuals standing therearound. Furthermore, the winch ring 10 operates to provide two "pulley blocks" or "pulleys", whereby one pulley is formed by the annular groove 400 and another pulley is formed by the attachment aperture 500. This multi-pulley configuration of the winch ring 10 increases its versatility, while the increased number of pulleys provided by the winch ring 10 allows a user to increase the pulling capacity of the winch line that is used with the pulley points.

A. Winch Ring Structure:

Specifically, the winch ring 10 includes the body 100, which may be formed of any suitable material, such as metal, including steel or aluminum for example, as well as metal alloys and metal composites. In addition, the body 100 may be formed of plastic, ceramic, as well as composite materials, and any combination thereof.

The winch ring 10 includes the flanges or faces 200 having a peripheral edge 510, which are arranged in an opposed manner on either side of the annular groove 400. In some cases, the flanges or faces 200 may be arranged so that they are parallel to each other, but in some cases may be arranged in a non-parallel orientation.

Figure 4:
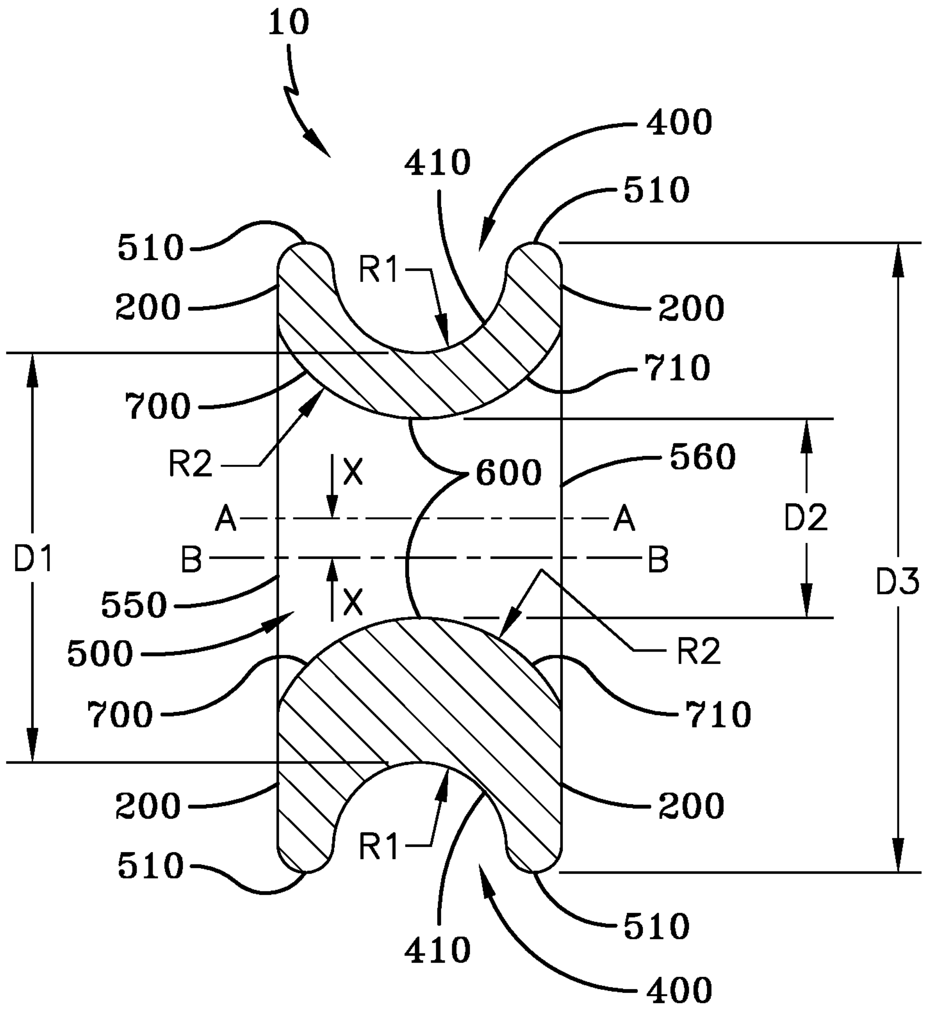
FIG. 4 is a cross-section view of the winch ring in accordance with the concepts of the various embodiments disclosed herein.

Continuing, the flanges or faces 200 are spaced apart by the annular groove 400, which is defined by a concave groove surface 410. That is, the concave groove surface 410 extends between the flanges 200. In addition, the concave groove surface 410 may have any suitable radius R1, as shown in FIG. 4. It should be appreciated that in some embodiments, the radius R1 of the curvature of the concave surface 410 may be between 0.5" to 3.0", between 0.6" to 2.9", between 0.7" to 2.8", between 0.8" to 2.7", between 0.9" to 2.6", between 1.0" to 2.5", between 1.1" to 2.4", between 1.2" to 2.3", between 1.3" to 2.2", between 1.4" to 2.1", between 1.5" to 2.0", between 1.6" to 1.9", or between 1.7" to 1.8" for example; however, any desired dimension may be used. It should be appreciated that the concave groove surface 410 may have a depth between 1.0" to 2.0", between 1.1" to 1.9", between 1.2" to 1.8", between 1.3" to 1.7", or between 1.4" to 1.6"; however, any desired dimension may be used. In addition, the flanges 200 and the concave groove surface 410 together form the annular groove 400 that has a suitable depth and width to accommodate winch lines of various diameters therein. It should be appreciated that any suitable winch line formed of any suitable material may be used with the winch ring 10. For example, the winch line used with the winch ring 10 may be formed of natural or synthetic material, such as high modulus polyethylene or ultra-high modulus polyethylene (UHMP).

Continuing, the winch ring 10 includes the attachment aperture 500 that extends through the body 100. It should be appreciated that the aperture 500 may be defined by a wall surface 600 having a convex shape, as shown in FIG. 4 of the drawings. In addition, the convex wall surface 600 may have any suitable radius R2, as shown in FIG. 4. It should be appreciated that in some embodiments, the radius R2 of the curvature of the convex wall surface 600 may be between 1.0" to 3.0", between 1.1" to 2.9", between 1.2" to 2.8", between 1.3" to 2.7", between 1.4" to 2.6", between 1.5" to 2.5", between 1.6" to 2.4", between 1.7" to 2.3", between 1.8" to 2.2", or between 1.9" to 2.1" for example; however, any desired dimension may be used. Furthermore, it should be appreciated that the wall surface 600 may be any desired shape, including a rectilinear shape, a curvilinear shape, or a combination thereof. For example, in some embodiments, the wall surface 600 may include a cylindrical shape. It should also be appreciated that the wall surface 600 may be formed of multiple shapes, such as a combination of a convex and cylindrical shape or rectangular shape for example. It should be appreciated that in some embodiments, the attachment aperture 500 may have a diameter D2 at the apex of its convex wall 600 that is between 0.50" to 3.0", between 0.60" to 2.9", between 0.70" to 2.8", between 0.80" to 2.7", between 0.90" to 2.6", between 1.0" to 2.5", between 1.1" to 2.4", between 1.2" to 2.3", between 1.3" to 2.2", between 1.4" to 2.1", between 1.5" to 2.0", between 1.6" to 1.9", or between 1.7" to 1.8"; however, any desired dimension may be used.

The attachment aperture or cavity 500 is configured to have one opening 550 that is provided in one flange 200 and another opening 560 that is provided in the other flange 200. The openings 550 and 560 are substantially opposed to each other. In addition, regions 700 and 710 that are oriented proximate to respective openings 550 and 560 may be tapered, beveled, angled, sloped or otherwise graded. It should be appreciated that the openings 550 and 560 may have the same diameter or may have different diameters, whereby one of the openings 550, 560 is larger than the other. It should also be appreciated that the diameter of the openings 550, 560 is larger than the diameter D2 of the attachment aperture or cavity 500.

Figure 2:
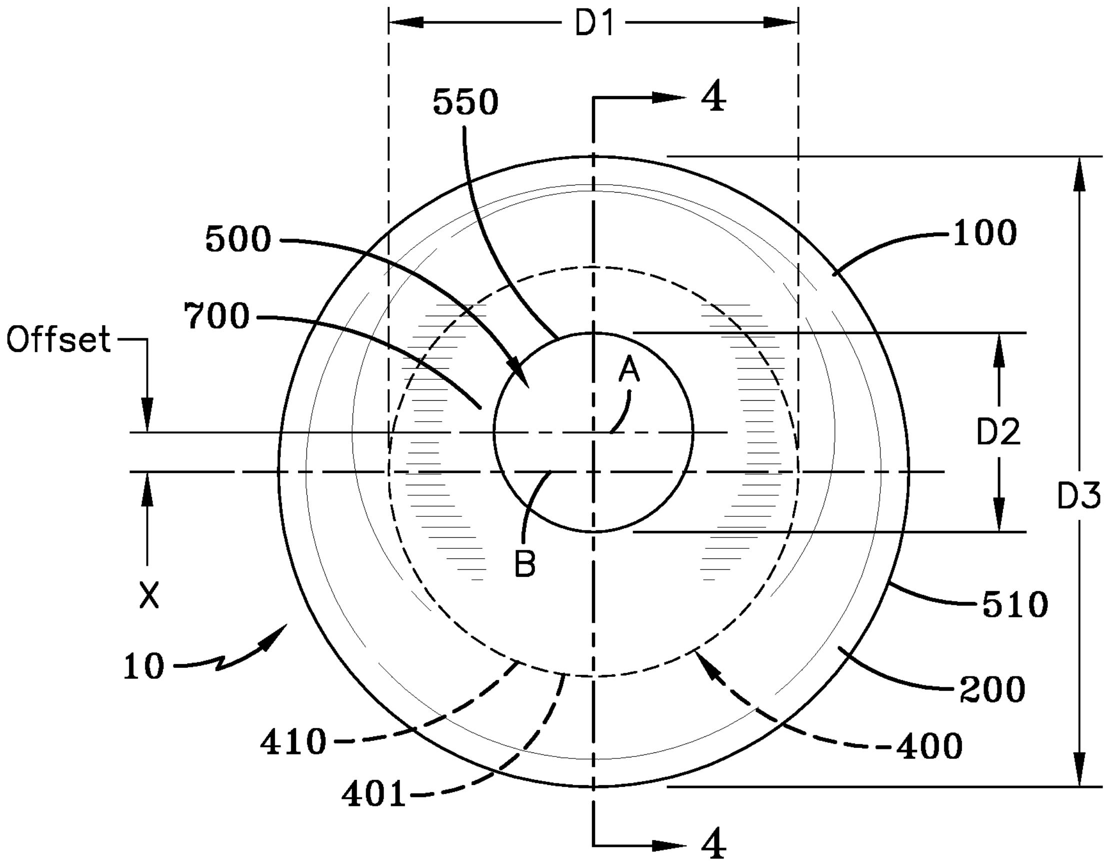
FIG. 2 is a is a top plan view of one side of the winch ring in accordance with the concepts of the various embodiments disclosed herein.
Figure 3:
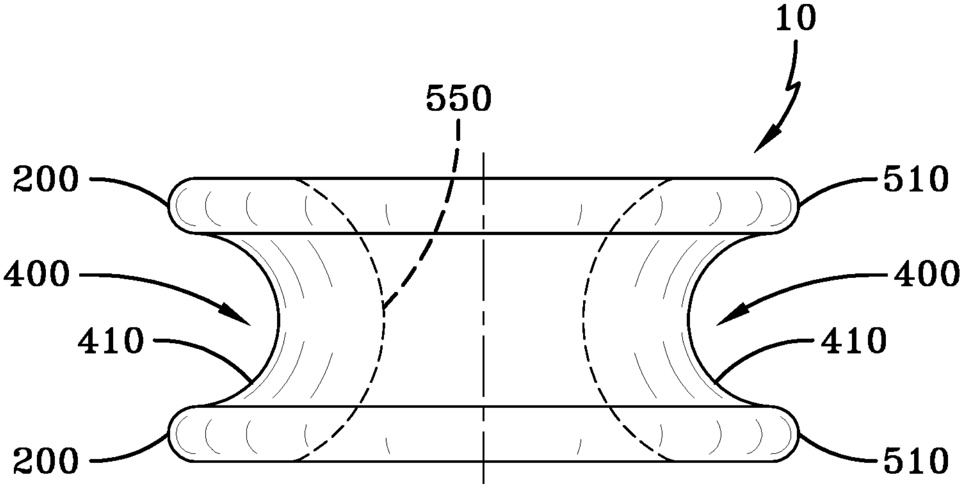
FIG. 3 is an elevational view showing an outer annular groove of the winch ring in accordance with the concepts of the various embodiments disclosed herein.

As shown in FIGS. 2 and 4, the winch ring 10 is configured so that the attachment aperture 500 is eccentric or offset from the concave groove surface 410. In detail, the attachment aperture or cavity 500 has a diameter (denoted by reference character "D2") that has a central axis (denoted by reference character "A"). In addition, the annular concave groove surface 410 has a diameter (denoted by reference character "D1") that has a central axis (denoted by reference character "B"). As such, the winch ring 10 is configured so that the central axis A of the attachment aperture 500 is eccentric or offset from the central axis B of the annular concave groove surface 410, by a distance denoted by reference character "X". The eccentric or offset orientation of the attachment aperture 500 forms the cam lobe 401 that inhibits the rotation of the winch ring 10 during operation. This is highly beneficial as it prevents the generation of friction and heat of an attachment line/soft shackle that is used to secure the winch ring 10 in place during its operation in a manner to be discussed. It should also be appreciated that the peripheral edge 510 of the flanges 200 have a diameter (denoted by reference character "D3") that has the central axis B. As such, the peripheral edge 510 of the flanges 200 are concentric with the attachment aperture or cavity 500 as they share the central axis B. It should be appreciated that the diameter D1 of the annular groove 400 may be between 3.0" to 4.0", between 3.1" to 3.9", between 3.2" to 3.8", between 3.3" to 3.7", or between 3.4" to 3.6"; however, any desired dimension may be used. It should also be appreciated that the diameter D3 of the outer edge 510 may be between 5.0" to 7.0", between 5.1" to 6.9", between 5.2" to 6.8", between 5.3" to 6.7", between 5.4" to 6.6", between 5.5" to 6.5", between 5.6" to 6.4", between 5.7" to 6.3", between 5.8" to 6.2", or between 5.9" to 6.1"; however, any desired dimension may be used. It should also be appreciated that the offset X may be between 20" to 0.40", or between 0.25" to 0.35"; however, any desired dimension may be used.

It should also be appreciated that the winch ring 10 may be provided as an unassembled kit, which may include various parts and components. In particular, one kit may provide the winch ring 10 in combination with one or more attachment lines or soft shackle/attachment line, which is configured to be looped through the attachment aperture 500 so that the winch ring 10 can be attached to a desired point. In addition, some kits may include one or more winch lines that are configured to pass through the annular groove 400, whereby one end of the winch line is attached to various points, such as a fixed, non-moving, or stationary point, while the other end of the winch line is attached to a pulling force, such as that provided by an electromechanical winch, for example. Thus, in some embodiments, the kit may include the winch ring 10 and one or more of an attachment line/soft shackle and a winch line.

B. Operation of Winch Ring:

It should be appreciated that the winch ring 10 (as well as multiple winch rings 10) may be utilized in a variety of arrangements and configurations, including the pulley systems and configurations discussed below, and that the following discussion is for exemplary purposes only and should not be construed as exhaustive or limiting. As such, one or more winch rings 10 may be used in various configurations to achieve the desired pulling/mechanical advantage, such as in the case of a 2:1, 3:1, 4:1, 5:1 mechanical advantage pulley system for example, although such should not be construed as limiting, as any number of winch rings may be used. Moreover, while the winch ring 10 is discussed herein as being used to pull a vehicle, such should not be construed as limiting, as the winch ring 10 may be utilized to pull any desired object.

Figure 10:
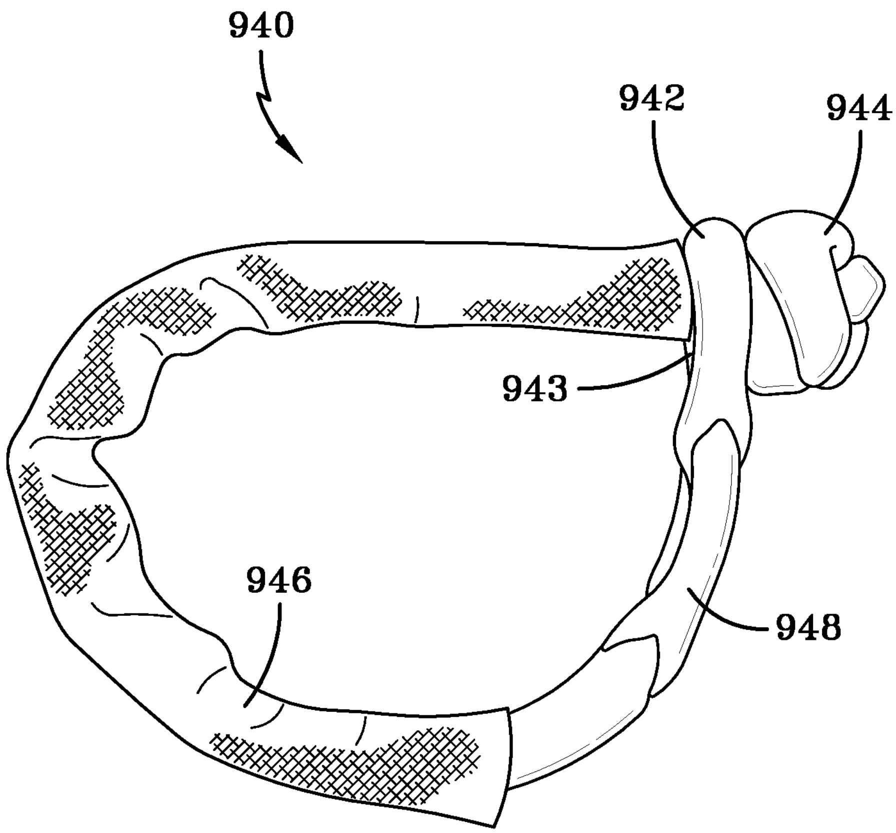
FIG. 10 is a perspective view of an attachment line/soft shackle used with the winch ring in accordance with the concepts of the various embodiments disclosed herein.

Furthermore, it should be appreciated that the winch ring 10 may be utilized with any desired lines, ropes, or fastening members. However, the discussion presented herein describes the use of the winch ring 10 in connection with an attachment line or soft shackle 940 (also, identified as 804, 890, 892, 960, 966), as shown in FIG. 10, which allows a loop to be selectively formed and closed for attaching various components together. For example, the soft shackle 940 may be looped through the attachment aperture 500 of the winch ring 10 to secure the winch ring to a desired object. In particular, the soft shackle 940 provides an elongated line member 946 having a body 948 formed of any suitable material, such as of natural or synthetic material, including high modulus polyethylene or ultra-high modulus polyethylene (UHMP) for example. The body 948 of the attachment line or soft shackle 940 is terminated at one end by a loop 942 having an opening 943. The other end of the attachment line or soft shackle 940 is terminated by a protrusion 944, such as a knot that is formed by the body 948 of the attachment line or soft shackle 940. It should be appreciated that the body 948 may have any suitable cross-sectional shape, such as a rectilinear shape, a curvilinear shape, or a shape that is the combination thereof. As discussed above, the soft shackle 940 is used to form a loop that can be selectively closed and opened to attach various object together. For example, to securely close a loop formed by the elongated line member 946 of the soft shackle 940, the protrusion 944 is forced through the loop 942. Alternatively, the protrusion 944 is forced back through the loop 942 to open the loop. It should be appreciated that the winch ring 10 is configured such that the attachment aperture 500 may be dimensioned so that it is able to receive the protrusion 944 of the soft shackle 940 therethrough.

Additionally, the winch ring 10 is discussed herein as being used in connection with a winch line 814, 902 (to be discussed in detail below), which may comprise any suitable elongated line member, such as a rope or cable for example; however, winch line 814, 902 may also encompass an elongated line member formed of natural or synthetic material, including high modulus polyethylene or ultra-high modulus polyethylene (UHMP) for example.

Figure 5:
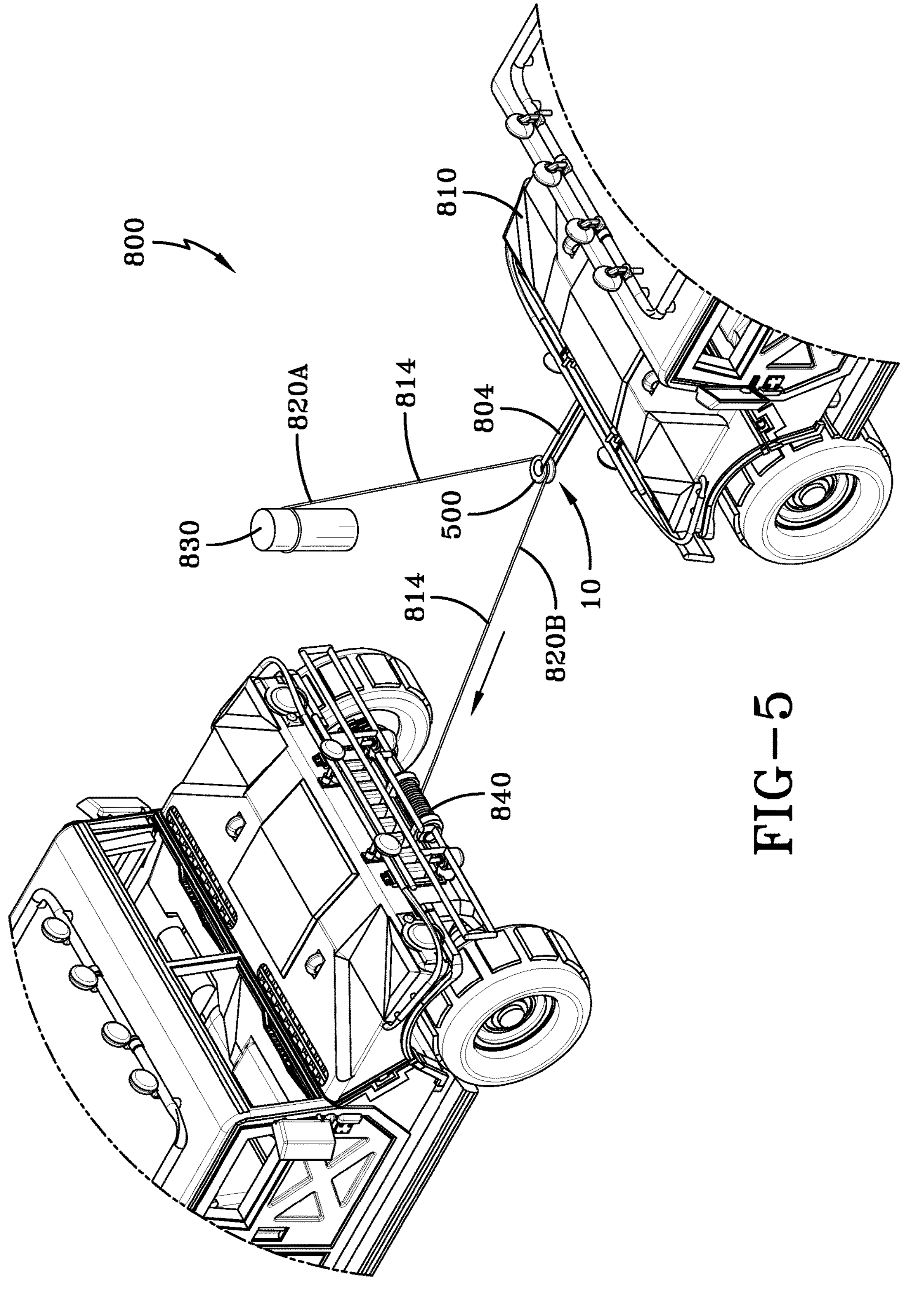
FIG. 5 is a perspective view of a pulley system formed by utilizing the winch ring, an attachment line and a winch line in accordance with the concepts of the various embodiments disclosed herein.
Figure 6:
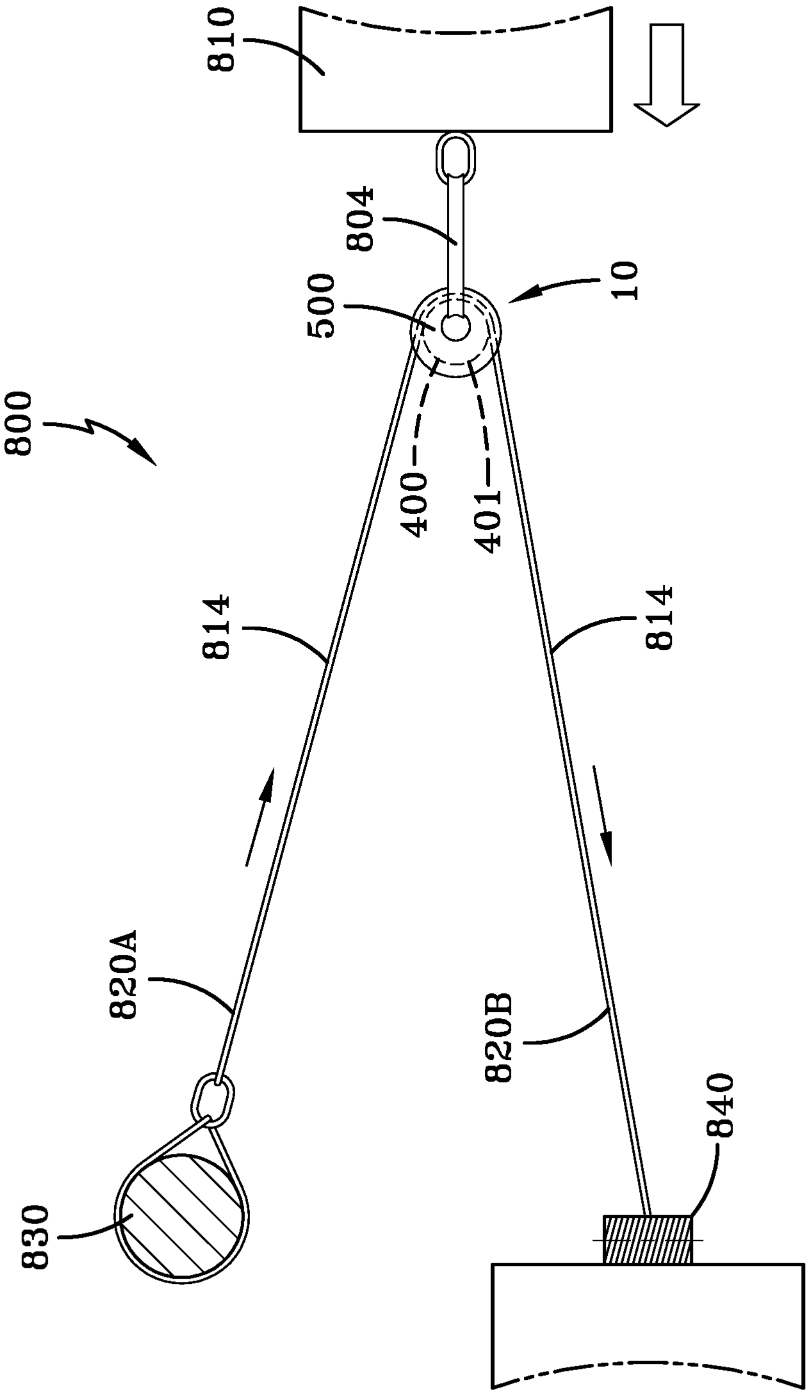
FIG. 6 is diagrammatic view of the pulley system of FIG. 5 in accordance with the concepts of the various embodiments disclosed herein.

In one example, the winch ring 10 may be utilized to form a pulley system 800, as shown in FIGS. 5 and 6, whereby an attachment line or soft shackle 804 is threaded through the attachment aperture 500 of the winch ring 10 and attached to an object 810 that is to be moved, such as a vehicle to be towed. Next, a winch line 814 is placed in the annular groove 400 of the winch ring 10 (so that the winch line 814 partially extends around the winch ring 10), such that one of the free ends 820A of the winch line 814 is attached to an anchored or fixed point 830 using any suitable means of fixation. In addition, the other free end 820B of the winch line 814 is attached to a pulling force, such as that provided by an electromechanical winch 840 for example. Thus, as the winch 840 is operated, it pulls the winch line 814 through the annular groove 400 of the winch ring 10, while the winch ring 10 itself remains stationary. That is, the winch ring 10 does not move or rotate as the winch line 814 is pulled through the annular groove 400. Because the winch ring 10 does not rotate, this prevents damaging friction and heat from being imparted to the attachment line 804 that passes through the attachment aperture 500 and that retains the winch ring 10 in place, which is highly desirable.

Figure 7:
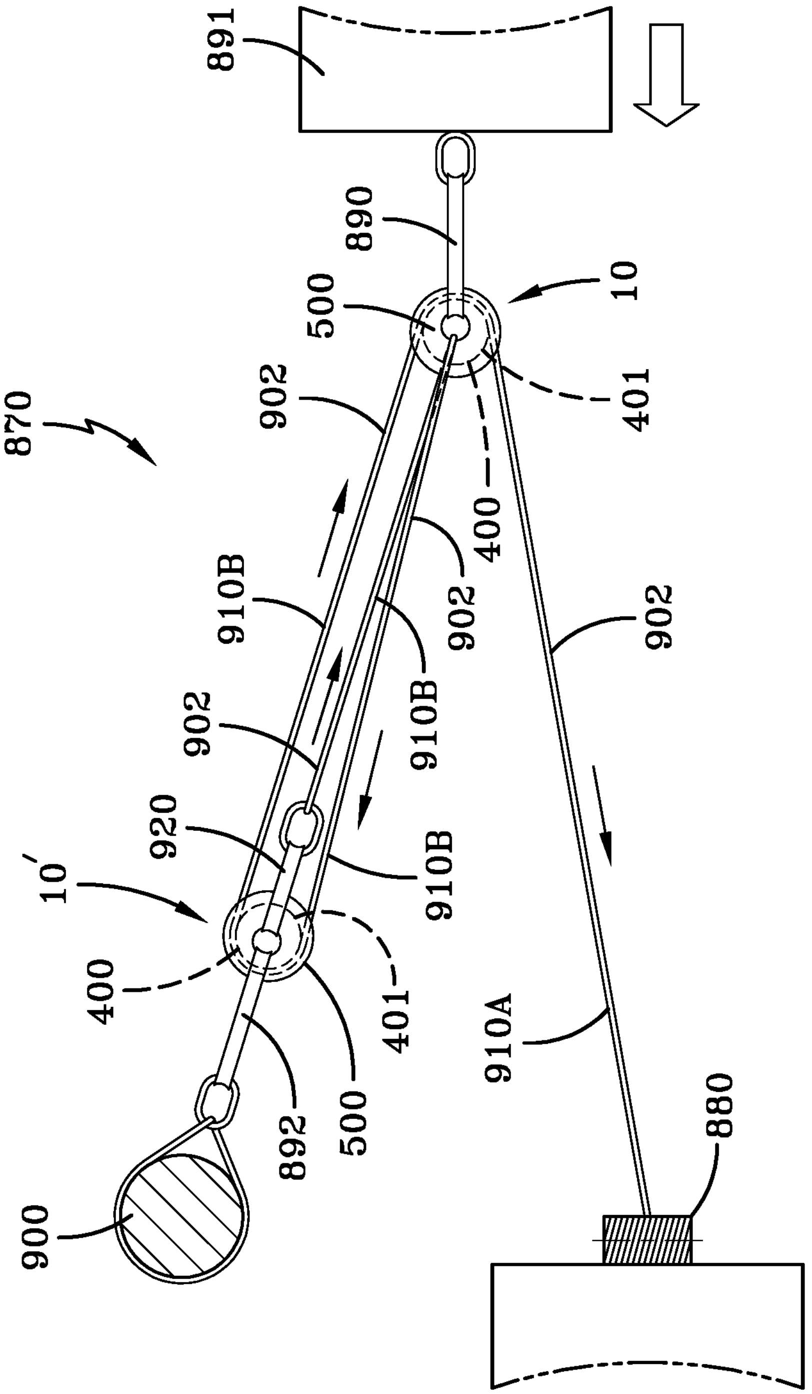
FIG. 7 is an alternative pulley system formed by using a pair of winch rings, a plurality of attachment lines, and a winch line in accordance with the concepts of the various embodiments disclosed herein.

In yet another pulley configuration 870, shown in FIG. 7, two winch rings 10 and 10' are utilized to multiply the pulling force applied by the winch 880 or other pulling force. As such, an attachment line or soft shackle 890 is threaded through the attachment aperture 500 of the winch ring 10 and attached to an object 891 that is to be moved, such as a vehicle to be towed. In addition, another attachment line or soft shackle 892 is threaded through the attachment aperture 500 of the winch ring 10' and attached to an anchored or fixed point 900 using any suitable means of fixation. Next, a winch line 902 is placed in the annular groove 400 of the winch ring 10 (so that the winch line 814 partially extends around the winch ring 10), such that one of the free ends 910A of the winch line 902 is attached to a pulling force, such as that provided by the electromechanical winch 880 for example. The other free end 910B of the winch line 902 is placed in the annular groove 400 of the winch ring 10' (so that the winch line 814 partially extends around the winch ring 10') and is then extended so that the winch line 902 is looped through the attachment aperture 500 of the winch ring 10. Next, the free end 910B of the winch line 902 is attached to the attachment aperture 500 of the winch ring 10' by an attachment line or soft shackle 920.

As, the winch 880 is operated, it pulls the winch line 902 through the annular groove 400 of the winch ring 10, while the winch ring 10 remains stationary. In addition, the winch line 902 is pulled through the annular groove 400 of the winch ring 10', while the winch ring 10' remains stationary. As previously discussed, the winch rings 10 and 10' do not rotate, which prevents damaging friction and heat from being imparted to the attachment line 890 that passes through the attachment aperture 500 of the winch ring 10 and the attachment lines 892 and 920 that pass through the attachment aperture 500 of the winch ring 10', which is highly desirable.

In addition, the pulling force applied by the winch 880 continues to pull the winch line 902 through the attachment aperture 500 of the winch ring 10, whereupon a pulling force is applied to the attachment line 920 that is attached to the attachment aperture 500 of the winch ring 10'. As a result, the pulling force achieved by the winch 880 is multiplied by operation of the pulley system 870. In addition, the winch rings 10 and 10' do not move or rotate as the winch line 902 is pulled through the annular grooves 400 of the winch rings 10 and 10'. Because the winch rings 10 and 10' do not rotate, this prevents damaging friction and heat from being imparted to the attachment lines 890, 892, and 920 that are coupled to the attachment aperture 500 of the winch rings 10 and 10' that are used to retain the winch rings 10 and 10' in place, which is highly desirable.

Figure 8:
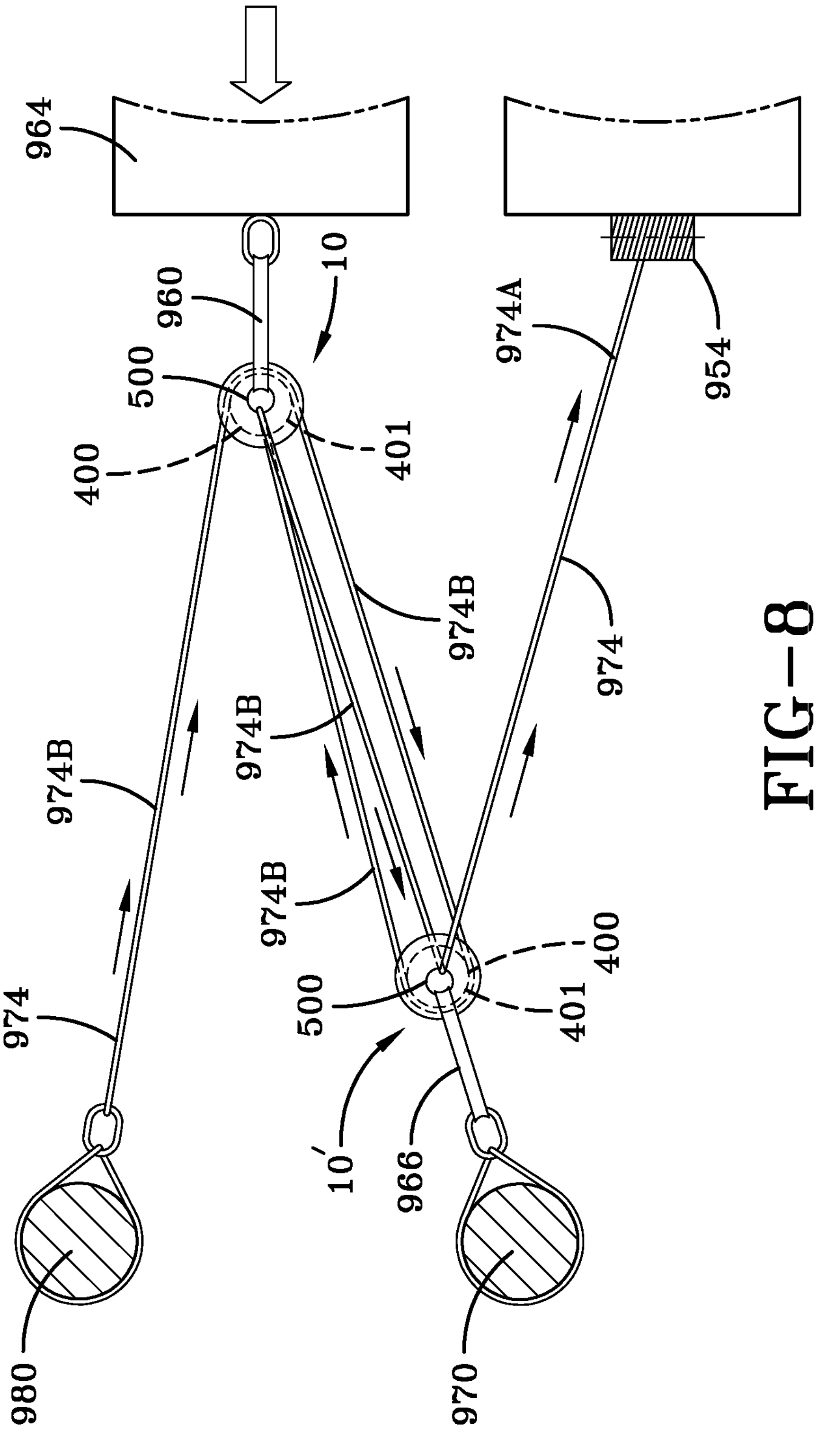
FIG. 8 is yet another alternative pulley system formed using a pair of winch rings, a plurality of attachment lines, and a winch line in accordance with the concepts of the various embodiments disclosed herein.

In still another pulley configuration 950, shown in FIG. 8, two winch rings 10 and 10' are utilized to multiply the pulling force applied by the winch 954 or other pulling force. As such, an attachment line or soft shackle 960 is threaded through the attachment aperture 500 of the winch ring 10 and attached to an object 964 that is to be moved, such as a vehicle to be towed. In addition, another attachment line or soft shackle 966 is threaded through the attachment aperture 500 of the winch ring 10' and attached to an anchored or fixed point 970 using any suitable means of fixation.

Next, a winch line 974 is routed such that one of the free ends 974A of the winch line 974 is attached to a pulling force, such as that provided by the electromechanical winch 954 for example. The other remaining free end 974B of the winch line 974 is routed through the attachment aperture 500 of the winch ring 10', where it continues to extend to the winch ring 10, where it passes through the attachment aperture 500 of the winch ring 10. After passing through the attachment aperture 500 of the winch ring 10, the end 974B of the winch line 974 continues toward the winch ring 10' and extends partially around the annular groove 400 of the winch ring 10', whereupon it extends back to the winch ring 10. At the winch ring 10, the end 974B of the winch line 974 extends partially around the annular groove 400 of the winch ring 10, whereupon it is attached to a stationary fixed point 980. It should be appreciated that in some embodiments, points 970 and 980 may be the same point.

Figure 9:
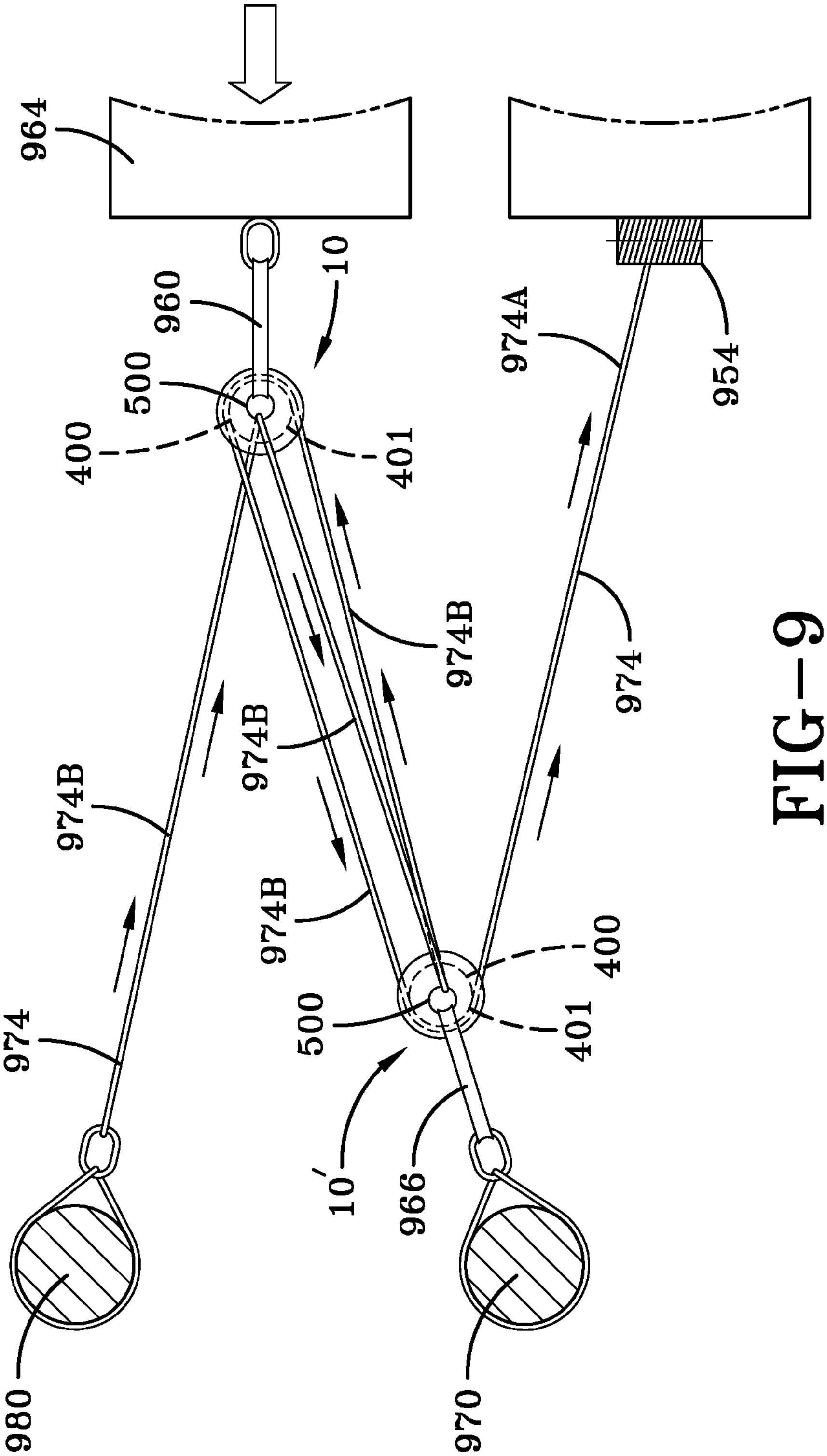
FIG. 9 is still another alternative pulley system formed using a pair of winch rings, a plurality of attachment lines, and a winch line in accordance with the concepts of the various embodiments disclosed herein.

In still another pulley configuration 990, shown in FIG. 9, two winch rings 10 and 10' are utilized to multiply the pulling force applied by the winch 954 or other pulling force. As such, an attachment line or soft shackle 960 is threaded through the attachment aperture 500 of the winch ring 10 and attached to an object 964 that is to be moved, such as a vehicle to be towed. In addition, another attachment line or soft shackle 966 is threaded through the attachment aperture 500 of the winch ring 10' and attached to an anchored or fixed point 970 using any suitable means of fixation.

Next, a winch line 974 is routed such that one of the free ends 974A of the winch line 974 is attached to a pulling force, such as that provided by the electromechanical winch 954 for example. The other remaining free end 974B of the winch line 974 is routed partially around the annular groove 400 of the winch ring 10' where the winch line 974 extends back to the winch ring 10. Next, the free end 974B of the winch line 974 is routed partially around the annular groove 400 of the winch ring 10, where it extends back to the winch ring 10', where the winch line 974 passes through the attachment aperture 500 of the winch ring 10'. After the end 974B of the winch line 974 pass through the attachment aperture 500 of the winch ring 10', the winch line 974 extends back to the winch ring 10 where the end 974B of the winch line 974 passes through the attachment aperture 500 of the winch ring 10. Once the end 974B of the winch line 974 passes through the attachment aperture 500 of the winch ring 10, it is attached to a stationary fixed point 980. It should be appreciated that in some embodiments, points 970 and 980 may be the same point.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. A winch ring comprising:
- a body;
- an annular groove extending around disposed in said body;
- a first flange and a second flange disposed on opposed sides of said groove; and
- a cavity extending through said body from a first opening to a second opening, said cavity having a central axis being eccentric to a base of said annular groove, said first and second openings being annular,
- wherein said cavity is at least partially defined by a convex surface, and said cavity and said annular groove are rigidly fixed to each other in said body.

2. The winch ring of claim 1, wherein said body is annular.

3. The winch ring of claim 1, wherein said annular groove is at least partially defined by a concave surface.

4. The winch ring of claim 3, wherein said concave surface has a radius of curvature of between 0.50" to 3.0".

5. The winch ring of claim 1, wherein said convex surface has a radius of curvature that is between 1.0" to 3.0".

6. The winch ring of claim 1, wherein said first and second openings include a tapered surface.

7. The winch ring of claim 6, wherein said tapered surface circumscribes said first and second openings.

8. The winch ring of claim 6, wherein said first opening and said second opening have a central axis that is eccentric to said base of said annular groove.

9. The winch ring of claim 1, wherein an outer edge of each said first flange and said second flange are curved.

10. The winch ring of claim 1, wherein said first flange and said second flange each have a peripheral edge having a central axis that is eccentric with said central axis of said cavity.

11. The winch ring of claim 1, wherein a diameter of each of said first and second openings is larger than a diameter of said cavity.

12. An unassembled kit comprising:

a winch ring comprising:

a body;

an annular groove extending around in said body;

a first flange and a second flange disposed on opposed sides of said groove; and a cavity extending through said body from a first opening to a second opening, said cavity having a central axis being eccentric to a base of said annular groove, said first and second openings being annular;

an attachment line adapted to be coupled to said cavity; and a winch line adapted to be received in said annular groove, wherein said cavity is at least partially defined by a convex surface, and said cavity and said annular groove are rigidly fixed to each other in said body.

13. The kit of claim 12, wherein said annular groove is at least partially defined by a concave surface.

14. The kit of claim 12, wherein said first and second openings include a tapered surface.

15. The kit of claim 14, wherein said tapered surface circumscribes said first and second openings.

16. The kit of claim 12, wherein said first opening and said second opening have a central axis that is eccentric to said base of said annular groove.

17. The kit of claim 12, wherein said first flange and said second flange each have a peripheral edge having a central axis that is eccentric with said central axis of said cavity.

18. The kit of claim 12, wherein a diameter of each of said first and second openings is larger than a diameter of said cavity.

* * * * *